United States Patent [19]

Hutchison et al.

[11] 4,354,878

[45] Oct. 19, 1982

[54] MINERAL ARTICLE SUCH AS THERMAL INSULATION CONTAINING VISUAL IDENTIFICATION MEANS

[75] Inventors: Ralph M. Hutchison, Evergreen; Phillip C. Martin, Conifer; Francis Y. Willingham, Littleton, all of Colo.

[73] Assignee: Manville Service Corporation, Denver, Colo.

[21] Appl. No.: 232,932

[22] Filed: Feb. 9, 1981

Related U.S. Application Data

[63] Continuation of Ser. No. 76,657, Sep. 18, 1979, abandoned.

[51] Int. Cl.$^3$ .............................................. C04B 1/00
[52] U.S. Cl. ........................... 106/120; 106/DIG. 3; 252/62
[58] Field of Search ................ 106/118, 120, DIG. 3; 252/62

[56] References Cited

U.S. PATENT DOCUMENTS 4,101,335  7/1978  Barrable .............................. 106/120

Primary Examiner—James Poer

[57] ABSTRACT

An asbestos-free mineral article useful as thermal insulation is described into which a visual identifying material is incorporated. The identifying material may be any of a variety of inorganic particulate materials such as particulate minerals, colored glass fibers or spheres, metal flakes or wires and the like. Preferred are mica flakes, present as 0.5% to 10% by weight of the article.

4 Claims, No Drawings

MINERAL ARTICLE SUCH AS THERMAL INSULATION CONTAINING VISUAL IDENTIFICATION MEANS

This is a continuation of application Ser. No. 076,657, filed Sept. 18, 1979, now abandoned.

TECHNICAL FIELD

The invention herein relates to mineral articles. More particularly, it relates to calcium silicate, perlite, magnesium silicate and like articles of the type commonly used for thermal insulation.

BACKGROUND OF PRIOR ART

Mineral materials have been used for many years as thermal insulation. The mineral bodies have been formed in the shape of flat slabs or rounded pieces for insulation of walls, pipes, tanks and many other industrial and commercial devices. Such mineral thermal insulation articles have typically been composed of perlite, synthetic calcium silicates and calcium silicate hydrates, synthetic magnesium silicates and magnesium silicate hydrates, magnesium carbonate and the like.

For many years such articles were commonly reinforced by incorporation of quantities of asbestos fiber. Typical examples are described in U.S. Pat. Nos. 2,016,039; 2,033,106; 2,062,879; 2,247,355; 2,326,516 and 2,326,517; 2,602,754; 3,257,220; 3,449,141. In more recent years, however, asbestos has been removed from the insulation products and the latter have been reinforced by materials such as glass fiber. Typical of the asbestos-free articles are those described in U.S. Pat. Nos. 3,501,324; 3,679,446; 3,965,020 and 4,162,924.

Because of their essentially mineral nature, all of these insulation articles have quite long service lives, commonly measured in years. If, for instance, a cylindrical mineral insulation is placed on a high temperature pipe in a manufacturing plant it can be expected that that insulation article will normally remain in position for a number of years and will be removed only if accidentally damaged or if there is reason to need access to the underlying pipe, as for repair, replacement or relocation of the pipe. In a large manufacturing plant, oil refinery, or the like it will therefore be expected that there will be large numbers of mineral insulation articles throughout the facility and that those insulation articles will be of different ages and types with older asbestos-containing materials still in use with or in proximity to newer asbestos-free materials.

Because of the current governmental regulations which require special precautions to be taken when workers handle asbestos-containing products, it is important to the insulation user to be able to identify which of the insulations contain asbestos and which do not. In the past, two different types of identification procedures have been used, but both have serious shortcomings. The first method involves taking a sample of the insulation article in question and performing a petrographic analysis on it to identify the presence of asbestos fiber in the non-asbestos mineral matrix. This is a costly and very time consuming process, particularly when a large number of pieces of insulation must be examined. In addition, many smaller manufacturing companies and the like which use mineral insulation have neither the facilities nor the personnel to perform such analysis. The second procedure has been to apply to the surface of the insulation articles some sort of visual identifying indicia. Commonly this has been in the form of a stripe of colored paint applied to the outer surface of each piece of insulation. While this can be done quickly and economically as part of the insulation manufacturing process, the paint stripe so applied frequently degrades and disappears in the high temperature service environment of the insulation. Thus when workers several months or years later are faced with handling the insulation, there is no longer any visual means associated with the piece of insulation by which they can determine whether or not it contains asbestos. Since in the absence of any direct identification of a material as being asbestos-free, governmental regulations require that it be handled as though it contained asbestos, the insulation customer must therefore use the expensive precautions associated with asbestos fiber containing materials or submit the installation articles for the expensive petrographic analysis to establish the absence of asbestos fiber.

It would therefore be of considerable advantage to have an identification system which would provide an unequivocal and permanent visual indication that the particular mineral insulation article in question was free of asbestos fiber content.

BRIEF SUMMARY OF THE INVENTION

The invention herein comprises an asbestos-free mineral article containing particulate indicating material in the mineral matrix in an amount effective to provide visual indicia contrasting in color and appearance with the color and appearance of the mineral matrix, with said indicating material being thermally stable at the service temperature of the mineral article and having no adverse effect on the physical and thermal properties of the mineral article. In various embodiments, the particulate material is distributed throughout the body of the mineral article and/or appears at the surface of the article. In a particularly preferred embodiment the indicating material is dark particulate mica. In various embodiments the mineral matrix comprises hydrated or anydrous calcium or magnesium silicate, magnesium carbonate or perlite. A principal use of these mineral articles is as thermal insulations.

DETAILED DESCRIPTION OF THE INVENTION

The invention herein comprises a mineral article having incorporated therein means to provide a visual indication that the article is free of asbestos fiber. In this specification the articles will be described in the context of their principal use as thermal insulations. It will be evident, however, that in other uses where the need for visual identification exists, the present invention is fully applicable.

In this invention the indicating material is an inorganic particulate material which is incorporated into the mineral matrix, usually by being dispersed throughout the matrix. The particulate indicating material will be thermally stable at temperatures of up to about 1800° F. (1000° C). By "thermally stable" is meant that the material retains its distinctive contrasting appearance so that even after extended periods at the elevated temperatures normally encountered by the mineral insulation article in use, the indicating material still affords an unequivocal and readily apparent visual indication of the asbestos-free nature of the article. It is, of course, not necessary that the indicating article retain its original color or the exact original appearance, as long as the color and appearance after extended service still effectively contrast with the basic white, light beige or other light coloration of the mineral insulation article. Thus, for instance, a particulate material which initially has a gold color could darken to a brown or black without affecting its function for the purposes of this invention.

It is also important that the indicating material when present in the mineral insulation article will not significantly adversely affect the physical or thermal properties of the article to any significant degree. Thus, important commercial properties of mineral insulations such as thermal conductivity and modulus of rupture should not be adversely affected in any significant manner by the presence of the indicating material.

The mineral thermal insulations useful herein may be any of a variety of conventional asbestos-free mineral-based insulations. These include perlite, hydrated and anhydrous synthetic calcium silicates, hydrated and unhydrated synthetic magnesium silicates, magnesium carbonate and the like. All of these form mineral matrices which are white, light beige, light gray or of similar light shades in coloration. Many may also contain small amounts of glass fiber, mineral wool and/or organic fibers such as kraft, polyester, flax and the like. Commercial materials include those sold by Johns-Manville Corporation under the trademarks "Thermo-12" and "Superex".

A variety of inorganic materials can be used as the indicating material of the present invention. These include short colored glass fibers, colored minerals such as dark mica or sand (quartz), small colored glass spheres, metal wires or flakes such as aluminum flakes, and the like. The coloration of the individual particles of the indicating material may be internal coloration as in the case of mica or it may be in the form of a colored coating on the surface of each particle, such as where a colored ceramic coating would be on the surface of a glass sphere. Internal coloration is preferred because of the inherent simplicity and is readily obtained through the use of minerals such as dark mica, dark metal flakes or wires or dark sand. It can also be obtained with the small glass fibers or glass spheres if suitable coloring oxides are incorporated into the mixture of glass forming raw materials during the manufacture of the glass fibers or spheres. If coatings are used to impart the color and/or appearance, the coatings themselves must meet the thermal stability and inertness toward physical properties required of the basic material. In addition, the coatings must also remain adherent to the unlying substrate particles.

In the present invention the identifying particulate material will be present as from 0.5% to about 10% by weight, preferably about 1% to 5% by weight, of the dry finished mineral insulation article. Quantities of material less than about 0.5% by weight do not appear to be present in sufficient quantity to provide unequivocal visual identification of the bodies, particularly when one is examining a small fragment of an insulation article. Quantities of from 0.5% to about 10%, preferably 1% to 5%, have been found to provide quite adequate and unequivocal identifying means, even when relatively small fragments of the finished article are being examined. Quantities of greater than about 10% do not significantly increase this already adequate identification and therefore cannot be economically justified. Further, large quantities above about 10% or greater may have a significant effect on the physical and/or thermal properties of the finished product.

Preferred among the various types of materials which can be used in the present invention is dark particulate mica. Mica is the generic name for a number of mineral species which have characteristic micaceous structure, i.e., highly perfect basal cleavage and easily separated into thin laminae. Among the micas are muscovite, paragonite, lepidolite, zinnwaldite, biotite, phlogopite and lepidomelane. These and other micaceous materials are described in Ford (ed.), *Dana's Textbook of Minerology* (4th edn., 1932) beginning on page 657. Mica, being a natural material, is found in a wide variety of colors depending on the chemical nature of the particular mica and the identity and presence or absence of impurities in the mica structure. For the purposes of the present invention the mica used will be a dark colored mica to contrast effectively with the light mineral matrix. For use in the present invention the mica will be comminuted to particles (flakes) having equivalent diameters up to about ¼ inch (0.6 cm.). The exact particle size is not critical, as long as it is large enough to be readily visible in the mineral matrix but not so large as to be unduly difficult to disperse throughout the material during the formation of the insulating body.

Normally calcium or magnesium silicate insulations and similar articles are made by reacting lime or magnesia and a siliceous material in an aqueous medium to form a silicate crystalline structure wherein the particular crystalline phases which may be present have varying degrees of hydration. The particular crystal structure or mixture of crystalline structures which are present will depend on such factors as the temperature and pressure of the hydrothermal formation reaction, the ratio of the lime or magnesia and silica raw materials and the length of reaction time. Typically the calcium silicate phases of insulating bodies are tobermorite, xonotlite and/or wollastonite phases of anhydrous or hydrated calcium silicates. After the silicate crystals are formed by the hydrothermal reaction, they are conveyed in the water slurry to receivers, which are large vats from which the crystalline material is taken to form the molded bodies, usually by filtration. After filter molding, the insulating bodies manufacture may be completed by drying or autoclaving, depending on the degree of crystallization obtained during the hydrothermal reaction. Alternatively filter molding can be replaced by casting in molding pans, especially when autoclaving is to follow. The identifying material may readily be added to the slurry in the receiver, along with other materials such as reinforcing glass fiber. When the final body is molded by press molding, screen molding, casting or the like from the reaction slurry, the particulate identifying material will be found dispersed throughout the matrix of the calcium silicate. In an alternate type of reaction to form silicates, in which the raw materials are reacted in situ in a molding pan, the identifying material will be added with the raw materials. Materials which are adversely affected by the alkaline reaction environment, such as some glass fibers, will of course not be suitable for use as identifying indicia if this type of calcium silicate reaction is used. For perlite insulations the identifying materials will be added to the slurry vat or molding pan with the perlite and starch binder raw materials. As the perlite insulation then forms, the identifying material is found dispersed throughout it. Addition to the identifying material to the magnesium carbonate bodies during their formation from magnesium hydroxide essentially parallels that of the addition to the silicate materials.

For the purposes of this invention, the dispersion and distribution of the particulate identifying matter need not be entirely uniform or random throughout the matrix, as long as the identifying material is sufficiently dispersed so as to provide adequate visual identification throughout the various portions of the particular article. Preferably a significant portion of the identifying material will appear at the surface of the article which is to be the surface which will be most visible to observers when the article is placed in service. Typically this would be the "cold face" of a piece of pipe or block insulation. The extent to which this concentration at the most visible surface can be achieved will depend on the manner in which the mineral insulation article is formed and the type of equipment available for dispersing the identifying material throughout the slurry from which the mineral insulating article is formed. For the purposes of visual identification in this invention, however, it is adequate if the identifying material shows at any of the surfaces of the article or is visible on broken or cut surfaces or visible in plugs or other samples removed from the article.

The advantages of the present invention may be readily compared with the use of materials such as organic or inorganic pigments in mineral insulation articles. For the most part, many pigments (especially the inorganic ones) are quite expensive materials. Many of them to be adequately visible must also be used in such high concentration that they have an adverse affect on one or more of the physical or thermal properties of the mineral insulation article. In addition, and very importantly, many of the pigments which become dispersed in the hydrothermal reaction slurry from which the mineral insulation article is made are not completely removed from that slurry during the subsequent molding operations. Rather sufficient residual pigment remains in the water to cause serious water pollution problems and to seriously complicate the disposal of slurry water. Further, many of the available pigments are not stable at the elevated temperatures which the insulations see in service, such that the color imparted to a mineral insulation by such pigments fades over the service life of the insulation and thus, of course, loses its ability to serve as adequate identification.

In a particular example, samples of asbestos-free calcium silicate hydrate made in accordance with standard commercial production methods were compared with samples similarly produced but to which approximately 3% by weight of finely divided mica had been added to the receiver from which the clacium silicate hydrate insulation bodies were molded. The particular mica used was a commercial dark phlogopite mica available under the trademark "Suzorite" from Marietta Resources International, Ltd. Grades 25-Z and 15-Z were used which were respectively a gold colored mica having an average flake size of 0.3 mm and a larger flake black colored mica having an average flake size of 0.6 mm. In all cases the samples containing the mica flakes were clearly identifiable both by visual inspection of the outer surfaces and inspection of broken and cut surface from within the samples. The mica flakes gave the white surface of the calcium silicate articles a distinct speckled appearance which appearance continued throughout the body of the samples. Molding techniques used in these laboratory scale tests tended to cause the mica to become concentrated at certain portions of the bodies, but considerable mica was still distributed sufficiently widely throughout the bodies to provide quite adequate identification. It is anticipated that larger scale, more refined distributing equipment and techniques will eliminate or greatly reduce any concentration of mica and improve the distribution. The identifying speckled appearance of the mica was clearly apparent and readily distinguishable from stains, dirt marks or other blemishes which commonly are found on the surfaces of calcium silicate insulations after service use. That there was no significant effect on the physical or thermal properties of the calcium silicate insulations is evident from Tables I and II below, which illustrates examples containing "Suzorite 25-Z" mica.

TABLE I

| Property | Control (no mica) | 2% Mica | 3% Mica |
|---|---|---|---|
| Density, lb/ft$^3$ | 13.2 | 13.3 | 13.3 |
| Moduls of Rupture, lb/in$^2$ | 80 | 76 | 74 |
| Compressive Strength, lb/in$^2$ | | | |
| 5% | 245 | 272 | 253 |
| 10% | 261 | 279 | 262 |
| Weight loss after 24 hrs at 1500° F., % | 1.9 | 2.1 | 2.2 |
| Abrasion loss, % | | | |
| 10 min. | 8.1 | 8.4 | 8.4 |
| 20 min. | 19.9 | 17.7 | 20.9 |

TABLE II

| | Thermal Conductivity, BTU-in/hr-ft$^2$-°F.[a] | | |
|---|---|---|---|
| Material | 600° F. | 800° F. | 1000° F. |
| Control (no mica) | 0.63 | 0.785 | 1.02 |
| With 3% mica | 0.635 | 0.79 | 1.005 |

[a]average value at mean temperature

STATEMENT OF INDUSTRIAL APPLICATION

The invention herein is useful in the formation and subsequent identification of mineral articles such as thermal insulations, which are widely used in manufacturing plants, oil refineries and similar facilities where high temperature equipment such as furnaces, pipes and the like must be thermally insulated for conservation of energy and/or protection of equipment and personnel in surrounding areas. This invention provides a simple and unequivocal means of visually identifying asbestos-free mineral insulations in their service environments in such industrial facilities.

We claim:

1. An asbestos-free mineral article containing particulate indicating material incorporated into the mineral matrix in an amount effective to provide visual indicia contrasting in color and appearance with the color and appearance of said matrix, said matrix comprising synthetic calcium silicate or synthetic calcium silicate hydrate, said indicating material being present in said matrix as 0.5 to 5 percent by weight of said article, being thermally stable at the service temperature of said article and having no significant adverse effects on the thermal and physical properties of said article.

2. An article as in claim 1 wherein said indicating material comprises particulate mica.

3. An article as in claim 2 wherein said mica is in the form of flakes having equivalent diameters of not more than ¼ inch.

4. An article as in claim 2 comprising a thermal insulation body.

* * * * *

UNITED STATES PATENT AND TRADEMARK OFFICE
CERTIFICATE OF CORRECTION

PATENT NO. : 4,354,878

DATED : October 19, 1982

INVENTOR(S) : Ralph M. Hutchison et al.

It is certified that error appears in the above-identified patent and that said Letters Patent is hereby corrected as shown below:

Claim 1 should read as follows:

1. An abestos-free mineral article containing particulate indicating material incorporated into the mineral matrix in an amount and of a particle size large enough to provide a speckled visual indicia contrasting in color and appearance with the color and appearance of said matrix, said matrix comprising synthetic calcium silicate or synthetic calcium silicate hydrate, said indicating material being present in said matrix as 0.5 to 5 percent by weight of said article, being thermally stable at the service temperature of said article and having no significant adverse effects on the thermal and physical properties of said article.

Signed and Sealed this

Seventh Day of June 1983

[SEAL]

Attest:

DONALD J. QUIGG

Attesting Officer

Acting Commissioner of Patents and Trademarks